US006645546B2

United States Patent
Roney et al.

(10) Patent No.: US 6,645,546 B2
(45) Date of Patent: Nov. 11, 2003

(54) PROCESS AND APPARATUS FOR PRODUCING FIBER PRODUCT WITH HIGH WATER-BINDING CAPACITY AND FOOD PRODUCT MADE THEREFROM

(75) Inventors: David L. Roney, Bakersfield, CA (US); Cristina E. Lang, Bakersfield, CA (US)

(73) Assignee: Wm. Bolthouse Farms, Inc., Bakersfield, CA (US)

( * ) Notice: Subject to any disclaimer, the term of this patent is extended or adjusted under 35 U.S.C. 154(b) by 194 days.

(21) Appl. No.: 09/888,211

(22) Filed: Jun. 22, 2001

(65) Prior Publication Data

US 2003/0044509 A1 Mar. 6, 2003

(51) Int. Cl.[7] .............................. A23B 7/02; A23L 1/212
(52) U.S. Cl. .................. 426/640; 426/455; 426/646; 426/443; 426/456; 426/464; 426/481; 99/348; 99/484; 99/485; 99/536; 366/14; 366/91
(58) Field of Search ................................. 426/431, 455, 426/549, 620, 640, 646, 443, 456, 464, 481; 99/348, 484, 485, 536; 366/14, 91

(56) References Cited

U.S. PATENT DOCUMENTS

| | | | | |
|---|---|---|---|---|
| 4,241,093 A | * | 12/1980 | Farag et al. ............. 426/258 |
| 4,451,489 A | * | 5/1984 | Beale et al. ............. 426/254 |
| 4,599,237 A | | 7/1986 | Pittet et al. |
| 4,737,582 A | * | 4/1988 | Goldman et al. ........... 536/2 |
| 4,783,239 A | * | 11/1988 | Rich ....................... 162/91 |
| 4,875,974 A | * | 10/1989 | Rich ....................... 162/10 |
| 4,876,102 A | * | 10/1989 | Feeney et al. ............ 426/550 |
| 4,905,585 A | * | 3/1990 | Lee ........................ 99/510 |
| 4,997,488 A | * | 3/1991 | Gould et al. .............. 127/37 |
| 5,069,919 A | * | 12/1991 | Weibel .................... 426/261 |
| 5,094,866 A | * | 3/1992 | Devic .................... 426/258 |
| 5,137,155 A | * | 8/1992 | Jonsson et al. ............ 209/2 |
| 5,137,744 A | | 8/1992 | Cagley et al. |
| 5,350,593 A | | 9/1994 | LaCourse et al. |
| 5,354,851 A | * | 10/1994 | Graves ...................... 536/2 |
| 5,403,612 A | * | 4/1995 | Huang .................... 426/577 |
| 5,605,114 A | * | 2/1997 | Peltenburg et al. ........ 119/171 |
| 5,863,582 A | | 1/1999 | Sugisaki |
| 6,074,856 A | * | 6/2000 | Wong et al. .............. 435/139 |
| 6,361,818 B2 | * | 3/2002 | Biyani et al. ............. 426/640 |
| 2001/0012534 A1 | * | 8/2001 | Biyani et al. ............. 426/599 |

OTHER PUBLICATIONS

Hoagland, P. D. J. Agric. Food Chem. 35: 319, 1987..*
Bao, B. J. Food Science 59:1160, 1994.*

* cited by examiner

Primary Examiner—Carolyn Paden
(74) Attorney, Agent, or Firm—Dorsey & Whitney LLP

(57) ABSTRACT

A dietary fiber product having a water absorption capacity of 8 to 15 times its weight and process for producing the same. The process includes the steps of selecting carrot material as the source for the fiber product (21), leaching a puree of the carrot material with an aqueous solution to remove the sugars from the carrot material (26), sizing the particles in the carrot material (34), bleaching the sized carrot material (41), reducing the moisture content of the bleached carrot material (46), flash drying the carrot material (43) and milling the dried carrot material to produce the dietary fiber product (49). A product produced by the process and apparatus for performing the process are disclosed, as are food products made from the carrot-based dietary fiber.

66 Claims, 2 Drawing Sheets

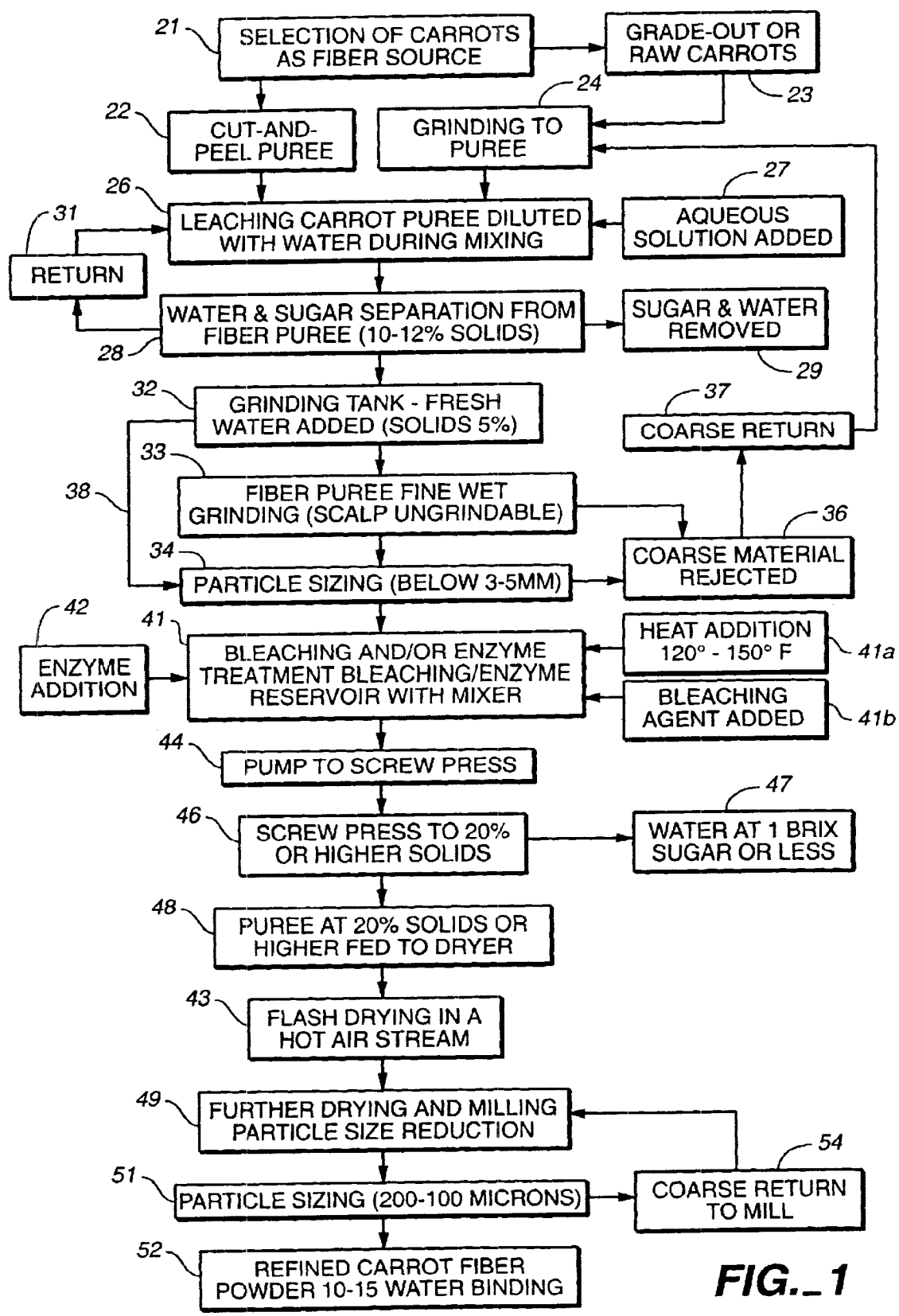
FIG._1

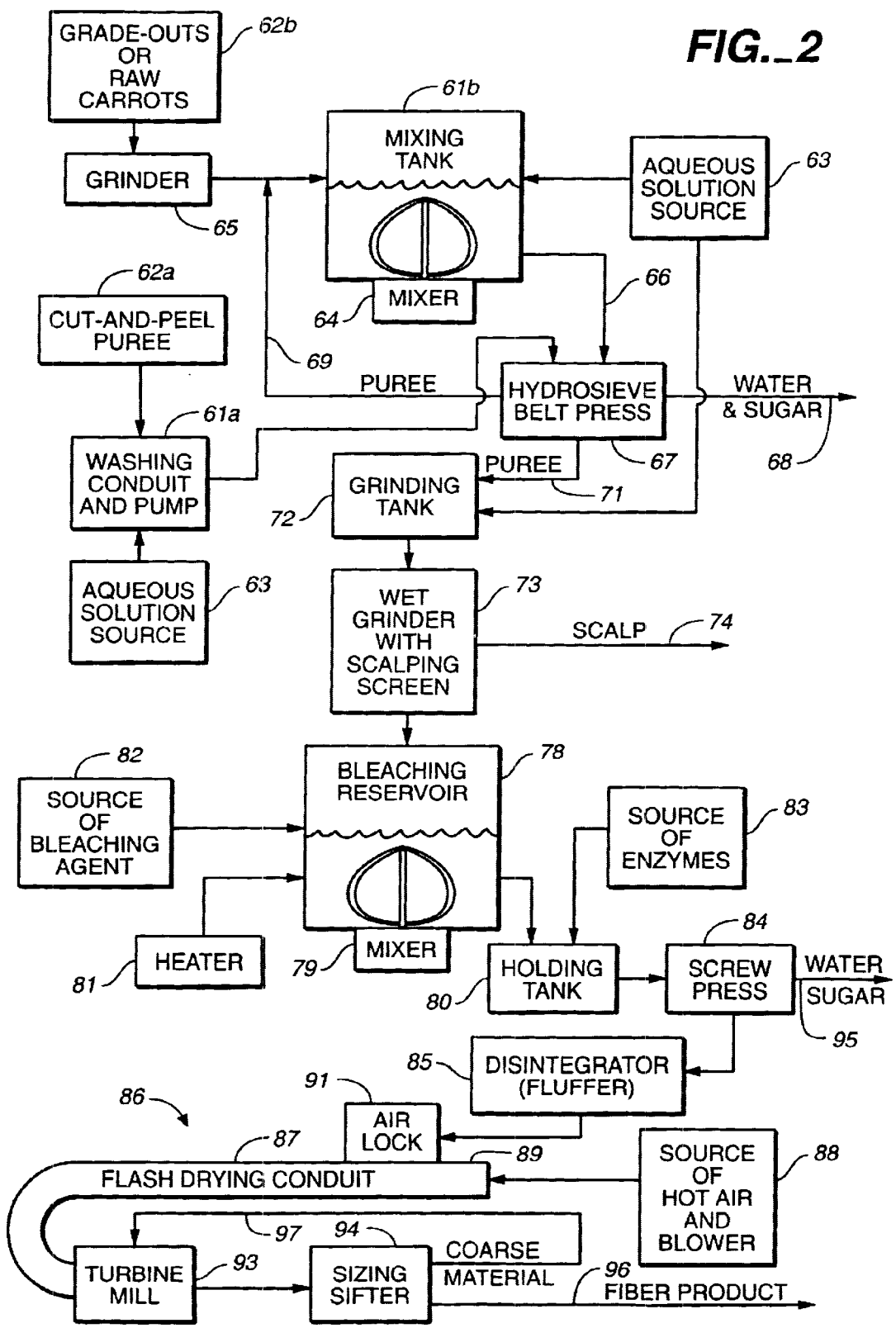
FIG._2

PROCESS AND APPARATUS FOR PRODUCING FIBER PRODUCT WITH HIGH WATER-BINDING CAPACITY AND FOOD PRODUCT MADE THEREFROM

TECHNICAL FIELD

The present invention relates, in general, to the production of fiber products, and particularly dietary fiber products, from various fiber-containing plant material such as fruits, grains, vegetables and cellulose products. More specifically, the present invention relates to a process, and resulting product, and the apparatus for the production thereof, which is capable of producing a dietary fiber of high water-binding capacity, that in turn may be used to produce high fiber food products.

BACKGROUND ART

Diets high in fiber have been endorsed by many sources for the potential health benefits they offer. High fiber diets are reported to reduce the risk of colon and rectal cancers and to reduce blood serum cholesterol levels. In addition, since fibers are not easily digested by humans, dietary fiber ingredients are non-caloric and contribute to a reduction in total food calories consumed when used as a replacement for carbohydrates, proteins, and fats in a wide variety of food product formulations.

The total dietary fiber (TDF) of a food or food ingredient is in two forms: soluble dietary fiber (SDF) and insoluble dietary fiber (IDF). Soluble dietary fiber can be defined as a fiber that is soluble in aqueous solutions designed to simulate human digestive systems. However, the term soluble fiber often is used loosely to refer to the solubility of the fiber in water. If a fiber is declared water-soluble this does not mean a completely dissolved state, as for example, glucose would be in water. Solubility of fiber is the dispersion state of the polymer in water, existing in a colloidal dispersion. Insoluble dietary fibers resist even a colloidal dispersion.

Many dietary fibers are marketed for use in formulating "healthy" food products. Typical fibers and their TDF, SDF, and IDF are shown in Table I below.

TABLE I

| Fiber Source | TDF | SDF | IDF |
|---|---|---|---|
| Psyllium husk | 87% | 70% | 17% |
| Alpha-Cellulose | 99% | 0% | 99% |
| Beet Fiber | 75% | 24% | 51% |
| Corn Bran | 90% | 2% | 88% |
| Oat Bran | 25% | 12% | 13% |
| Refined Oat Bran | 97% | 1% | 96% |
| Rice Bran | 30% | 4% | 26% |
| Wheat Bran | 40% | 0% | 40% |
| Pea Fiber | 45% | 5% | 40% |
| Potato Fiber | 75% | 18% | 57% |
| Soy Fiber | 75% | 15% | 60% |
| Tapioca Fiber | 70% | 12% | 58% |

In the baking industry, for example, formulating healthy or high-fiber food products is greatly affected by the ability of the dietary fiber to absorb or bind water. The ability to fix water in baking formulations contributes a pleasing moistness, adds fullness, and improves the appearance of many baked food products. However, serious functional problems are frequently encountered when formulating foods containing high-fiber ingredients. Flavor and color are inherently critical to bread and cereal products intended for consumer use. Bakers, therefore, face tradeoff decisions when adding dietary fiber to baked products. Using too much fiber can produce unwanted flavors, colors, and textures.

The ability of a fiber to bind water creates a moister food product. Most fibers available to the baking industry can absorb (bind) two to four times their weight in water. Increasing the water binding capacity of baked goods having dietary fiber added to their formulation often must be achieved by using gums and pectin, rather than the fiber itself.

The water-binding capacity of various dietary fibers is set forth in Table II below.

TABLE II

| Fiber Source | Water-Binding Capacity (g water/g fiber) |
|---|---|
| Soy | 2 |
| Oat | 4 |
| Cottonseed | 4 |
| Wheat | 4 |
| Cellulose | 4 |
| Pea | 5 |

Texture problems in baked products can include: lack of volume or expansion in baked goods or cereals, non-uniform texture, unpredictable water holding and/or absorption characteristics, interference with the production of extruded and expanded cereals or snacks, and qualitative problems, such as "mouth feel." One approach to controlling unwanted textures is by maintaining fiber size below 100 microns. Fibers with a small size minimize the impact of coarse "mouth feel" or visual granularity, which bakers typically wish to avoid.

Various processes have been devised in order to extract dietary fiber from fiber-containing sources. Typical of the patent literature relating to dietary fiber extraction are U.S. Pat. Nos. 5,137,744, directed to a sugar beet fiber extraction process, and 5,350,593, directed to a tapioca pulp fiber production process.

U.S. Pat. No. 5,137,744 achieves fiber extraction primarily based upon heating, and is directed to the reduction of off-odor and off-flavor problems which are encountered with sugar beets. Hydrogen peroxide is used as part of the fiber treatment process. U.S. Pat. No. 5,350,593 employs both enzyme treatment and bleaching of tapioca fiber. The bleaching takes place after the enzyme treatment and numerous bleaching agents were tried, including benzoyl peroxide which produced a poor result.

U.S. Pat. No. , 5,403,612 discloses a process for producing a pectin-containing fiber product from fruits, vegetables, grains and grasses. One possible fiber source is listed as carrots. In U.S. Pat. No. 5,403,612, however, the fiber material obtained from the various fiber sources is processed in a manner which results in fiber containing pectin, which thereafter is subject to phosphorylation. U.S. Pat. No. 5,354,851 also discloses a process for manufacturing a crude pectin containing product from various fiber containing fruits, vegetables, including carrots, and grasses using an ion exchange method. The use of ion exchange is also disclosed in U.S. Pat. No. 5,863,582 for the processing of various vegetables, including carrots. Finally, U.S. Pat. No. 4,599,237 discloses the use of various bleaching and maturing agents in a process for augmenting or enhancing the aroma of food stuffs.

It also is known to use carrots as a source for dietary fiber in which the carrots are ground and then dehydrated to produce a fiber supplement. See, e.g., "Does Chronic Supplementation of the Diet with Dietary Fibre Extracted from Pea or Carrot Affect Colonic Motility of Man?," *British Journal of Nutrition,* Vol. 76, pp 51–61 (1996). The carrot fiber studied, however, was not a sugar-free, colorless, odorless, tasteless product which would be suitable for fiber fortification of other food products.

Accordingly, while it is known to extract dietary fiber from a wide variety of fiber-containing plants, there is a considerable need for a process which is capable of producing a fiber product, and particularly a dietary fiber product, which has desirable organoleptic properties and has a substantially enhanced water-binding capacity, as compared to conventionally produced dietary fibers.

It is, therefore, an object of the present invention to provide a dietary fiber production process, apparatus and fiber product, which has high water absorption capacity and desirable organoleptic properties, as well as to provide food products made therefrom.

DISCLOSURE OF INVENTION

In one aspect, the present invention comprises a process for producing a fiber product having a high water absorption or binding capacity. This process is comprised, briefly, of the steps of selecting carrot material as the source for the fiber product; leaching sugar from a puree of carrot material using an aqueous solution until the sugar remaining in the carrot material has been substantially reduced; after the leaching step, separating the carrot material having a particle size below a predetermined level from the aqueous solution; adding back a new aqueous solution to the carrot material; bleaching the separated carrot material while in the aqueous solution with a bleaching agent; and after the bleaching step, removing the bleached carrot material from the aqueous solution, and drying the bleached carrot material to produce a dried carrot fiber product having a high water absorption capacity.

The water absorption or binding capacity of the resultant fiber product produced by the process of the present invention will typically be in the range of 8 to 15 times the weight of the carrot fiber end product. In the preferred process, the sugars are leached from the puree of carrot material until the sugar is below about 1 weight percent. The puree is wet-ground to pass through a sizing device before bleaching and is bleached at an elevated temperature using an organic peroxide or peracitic acid as a bleaching agent. The aqueous solution is then separated and the bleached carrot material is preferably flash dried at temperatures above 500° F., followed by milling and sizing to produce a food grade dietary fiber product having high water-binding capacity.

In another aspect, the apparatus of the present invention is comprised, briefly, of a mixing apparatus, a water removal assembly formed to receive a mixture of a puree of carrot material and aqueous solution and to separate the carrot material from the solution; a source of aqueous solution connected for input into the mixing apparatus; a grinding device receives carrot material from the water removal assembly and formed to grind the carrot material puree, while in an aqueous solution; a sizing device receives the ground puree and is formed to allow passage of carrot material below a predetermined particle size into a mixing reservoir; a source of bleaching agent is coupled for input to the mixing reservoir; a water separation device is positioned to receive the bleached puree and is formed to remove aqueous solution so as to substantially increase the solid contents of the carrot material puree; and a dryer assembly is connected to dry the carrot material preferably by flash drying the material at an extremely high temperature. Optionally the flash dried carrot material is ground in a turbine mill while drying continues and then sized further before use.

In a final aspect, food products made from dietary fiber produced by the process and the apparatus of the present invention are provided.

DESCRIPTION OF THE DRAWING

FIG. 1 is a flow diagram illustrating a fiber product production process according to the present invention.

FIG. 2 is a schematic diagram of apparatus suitable for operation of the process of FIG. 1.

BEST MODE OF CARRYING OUT THE INVENTION

While carrots are broadly known in the prior art as a fiber-containing source, little has been done to produce dietary fiber from carrots which is organoleptically desirable or neutral. Moreover, to the extent carrots have been used as a fiber source, they have been processed in a manner which is not conducive to the generation of a high water absorption or binding capacity.

As can be seen from Tables I and II above, many plant sources of dietary fiber have been investigated, and those sources for which data are available concerning water absorption or water binding capacity have been found to produce fibers which have a absorption capacity on the order of between about 2 to about 5 times their weight. While not insignificant, it is highly desirable to be able to increase the water absorption capacity of dietary fibers so that they can be incorporated into various food stuffs, and particularly products such as bread and cereal, to enhance the moisture and mouth feel of such food products.

Accordingly, referring to FIG. 1, the first step of the process of the present invention, and an important aspect of the attainment of dietary fiber having a high water absorption capacity, is step 21 of selecting carrots or carrot material as the source for extracted, organoleptically desirable fiber products. Carrot material, if processed as disclosed herein, can achieve a water absorption capacity of up to 15 times its weight. This is 3 to 7 times the water absorption capacity of the conventionally used dietary fibers set forth in Table II. This result can be achieved while still achieving organoleptic properties which are highly desirable and therefore well suited for use in food stuffs. Carrot material, when treated in accordance with the process of the present invention, therefore, will produce a dietary fiber which not only has a greatly increased water absorption capacity, but also is substantially odorless, colorless and has no off-flavors, as well as being smooth and uniform in its texture.

The resultant fiber product has at least 92% total dietary fiber with a range of about 12% to about 30% soluble dietary fiber. Most typically, the soluble dietary fiber is in the range of about 20 to about 25 weight percent, with the insoluble dietary fiber in the range of about 67% to about 72% by weight.

There are two primary commercial sources of the carrot material, namely, by-product from a fresh carrot cutting and peeling process (cut-and-peel carrot material), and cut or uncut, peeled or unpeeled, carrots obtained from fresh carrot processing operations (grade-out carrot material). Conventionally, cut-and-peel grade-out carrot material are currently sold as unprocessed animal feed.

Crude fiber from cut-and-peel carrot material is approximately 2% sugar and 90% TDF, of which 25% is SDF, using dry-weight measurement. Grade-out carrot material contains approximately 55% sugar, 32% TDF, and 10% SDF. The large sugar and fiber variance between the two sources is due to the pre-processing inherent in the fresh cutting operation. Cut-and-peel carrot material is the result of a carrot peeling process that uses large amounts of water that leaches out or removes a significant amount of the sugars present in the carrot material, as well as proteins and lipids. Grade-out carrot material has not been through particle size reduction process or a rinsing process. Thus, grade-out carrot material retains most of the properties of unrefined or raw carrots.

It has been discovered that by extracting the fiber from either of the two primary carrot material sources using the present process, a neutral-tasting, neutral-colored, highly functional, dietary fiber is derived that is high in both TDF and SDF. The present process retains 80% of the SDF by weight.

When the carrot material is from a cut-and-peel processing operation, a puree of carrot material having a solids content of about 10% to about 12%, by weight, can be conveyed or transported from the cut-and-peel operation to the present fiber extraction operation, for example, by pumping.

Since substantial sugar reduction or removal from the carrot material is an important aspect of the process of the present invention, the most preferred source of carrot material is a puree of carrot material from a cut-and-peel operation, as shown by box 22 in FIG. 1. The carrot material from a cut-and-peel operation will have had its sugar content reduced from about 50% by weight of the solids to under 5% by weight of the solids, and the carrot material will already be in a puree. Thus, if the cut-and-peel carrot material puree is 10–12% solids, the sugar content will be about one-half of one % by weight of the puree. In order to avoid stickiness and off colors (browning of the sugar), the present invention seeks to reduce the sugar content in the carrot fiber material to blow 1% of the bone dry solids.

When grade-out carrot material is employed, the size of the carrot material must be reduced substantially in order to increase the surface area for leaching of sugars out of the grade-out carrot material. Thus, for use of grade-out carrot material, as shown by step 23, an additional preliminary step 24 of grinding the carrot material to produce a puree of small particle size and substantial surface area must be taken. The grinder can be, for example, a RIETZ Model RP-18 disintegrator manufactured by Hosokawa Bepex Corporation of Santa Rosa, Calif.

It would be possible to use raw or completely unprocessed carrots as a fiber source in the present process, and if used, preliminary grinding process 24 would also be performed to create a puree in which small carrot particles having a high surface area are present. The puree particle size from the grinder typically will be in the range of ¼ to 3/16 inches.

As will be apparent, various combinations of cut-and-peel puree 22 and grade-out or raw carrot puree from grinding step 24 could also be used in the present process, depending upon the availability of these sources.

The next step in the present process is a leaching step 26 in which carrot material puree is diluted with water and mixed to leach or dissolve sugars out of the puree until the sugar content is below 1% of the solids content. Leaching step 26 is preferably accomplished by mixing carrot puree and an aqueous solution, as shown at step 27. When cut-and-peel puree is used, the adding and mixing can be accomplished by water injection into washing and transfer conduits and mixing as the material passes though a pump, for example, during pumping from the cut-and-peel operation to the fiber extraction equipment. In the preferred embodiment, at least about equal weight percentages of carrot puree and aqueous solution are mixed. The incoming puree from a cut-and-peel operation typically will have a solids content of about 10% to 12% by weight of the puree, aqueous solution may be added at step 27 until the solids content in the transfer conduit to the extraction equipment is between about 1 weight percent to about 5.

When grade-out or raw carrot puree is used, a mixing tank is employed and about an equal amount of aqueous solution and puree combined in the tank. Leaching step 26 is then accomplished by mixing the aqueous solution with the carrot puree in the tank for about 3 to about 20 minutes.

As set forth below, when grade-out or raw carrots are employed to form the carrot material puree as shown at step 24, several leaching cycles will be performed required to reduce the sugars remaining in the puree to a desired low level, for example, below about 1 weight percent. For the cut-and-peel puree about 3 to about 5 minutes of pumping travel time will drop the sugar content to below 1% by weight of the solids.

A separating step 28 is then performed in which the carrot material is separated from the aqueous solution containing the leached-out sugars. Such separation can be accomplished using hydrosieves, strainers or hydroshears and/or a belt press, but other water separation techniques can be employed. The separation step essentially attempts to bring the solid contents of the carrot fiber puree back to the level of about 10% to about 12% by weight of solids. Roughly, therefore, as much aqueous solution with dissolved sugars is removed, as indicated by box 29, during separation step 28 as was introduced to enable leaching.

The separated carrot material puree is then either returned to the mixing tank for a repeat of the aqueous solution addition and mixing, or is sent on to a sizing operation. Step 31 in FIG. 1, therefore, is the step of returning the carrot fiber puree, after separating of the aqueous solution and sugar to the mixing tank for the addition of more aqueous solution, as indicated by step 27, so that additional sugar leaching can take place. The loop between steps 26, 28 and 31 is repeated until the sugar remaining in the ground carrot material forming the puree has been substantially removed. Once the sugar level is down below 1 weight percent of the solids, the carrot material puree will be sent to the sizing steps so that the particle sizes in the puree are below a predetermined level. The return step 27 is not normally required for cut-and-peel carrot puree.

Particle sizing preferably is accomplished by adding a fresh aqueous solution wash to the separated, reduced sugar puree in a grinding holding tank until the solids level of the mixture again is reduced to approximately 5% to about 6% by weight. This is shown at step 32, and the puree with added water may then be wet ground, as shown at step 33. The grinding apparatus preferably includes a sizing device which effects a particle sizing step 34, with the coarse material being scalped from the grinder, as shown by step 36. This coarse material may be disposed of or returned, as shown in step 37, to a grinding apparatus 65 (FIG. 2) for repeat of grinding step 24 to further reduce the particle size of the puree.

As will be appreciated, it also would be possible to bypass grinding step 33, as shown by arrow 38, and simply size the carrot material puree after step 32 of adding aqueous solution. For cut-and-peel puree, the coarse material rejected at step 36, and returned at step 37, would be at acceptable levels. For grade-out or raw carrot puree, a direct particle sizing step 34 which bypasses wet grinding step 33 can produce an undesirably high volume of coarse material, which would need to be returned for further grinding. Accordingly, wet grinding step 33 reduces the coarse material rejected at step 36 for both sources of carrot material, and it is, therefore, preferred in the present process that a wet grinding step by present before sizing step 34.

Preferably, particle sizing step 34 is one in which particles of a size below 3 millimeters will pass through the sizing and grinding device, for example, a screen passing particles of 3 millimeters or less.

Carrot puree particles which have been sugar leached and sized are subjected to a bleaching step 41. Bleaching most preferably occurs in the aqueous solution added before wet grinding. A bleaching agent is added to the mixture which is selected not to have detrimental affects on the resulting fiber product. When dietary fiber products are produced, the bleaching agent employed at step 41 is preferably a non-chlorine containing bleaching, such as an organic peroxide. Bleaching agents selected from the group consisting of benzoyl peroxide, hydrogen peroxide and peracitic acid are particularly well suited. All three bleaching agents are generally known in the literature as being suitable for bleaching plant fiber material in various applications, but their effectiveness varies widely with the fiber. Benzoyl peroxide, for example, is a known bleaching agent for wheat fiber, but it is also known to be relatively ineffective for tapioca fiber. It has been found, however, that benzoyl peroxide is the most preferred bleaching agent for use with carrot material to product a fiber having the best organoleptic properties.

Bleaching of the carrot material puree is preferably accomplished in the aqueous solution at an elevated temperature. Thus, step 41a includes the addition of heat to a mixture of substantially sugar-free and sized carrot puree and aqueous solution in a bleaching reservoir 78 (FIG. 2) having a mixer assembly. Addition of the bleaching agent is shown in step 41b.

Most preferably, the aqueous solution and carrot puree mixture is heated to between about 120° F. and about 150° F. when benzoyl peroxide is used as the bleaching agent. Raising the temperature of the carrot material puree and aqueous solution during bleaching accelerates the bleaching, but raising it to too high a level can destroy the effectiveness of the bleaching agent. Thus, for benzoyl peroxide a temperature of about 145° F. is preferred, with temperatures over about 150° F. causing degradation of the effectiveness of the benzoyl peroxide. Bleaching can be accomplished at room temperature, but bleaching at ambient or room temperature tends to require longer residence time in bleaching reservoir 78. Increased residence time, of course, reduces through-put and increases processing costs.

Bleaching step 41 can optionally be followed by an enzyme treatment step 42, in which enzymes are added after the bleaching step is essentially completed. The preferred enzyme treatment for carrot material fiber is the addition of a pectolytic enzyme. The present process, however, can be accomplished without the use of enzyme treatment. Enzyme treatment, however, has two advantages, and in the most preferred form of the present process the carrot material puree is both bleached and treated with an enzyme, in that order.

Enzyme treatment further reduces undesirable organoleptic properties of the carrot fiber material, and it has been found that enzyme treatment will increase the water absorption or binding capacity of the resultant fiber product significantly, for example, from 12 times the weight of the fiber to 15 times the weight of the fiber. Thus, enzyme treatment step 42 has a water absorption capacity increase effect which is significant.

Bleaching step 41 can also be varied depending upon whether or not an enzyme treatment step 42 is undertaken. Thus, the bleaching time can be reduced if enzyme treatment is also used.

In the most preferred embodiment of the present process, the carrot material puree is bleached for a time period which ranges from about 2 to about 4 hours, with 4 hours being preferred. After about 2 hours, the carrot material will be about 90% bleached, and extending the time to 4 hours increases the bleaching to produce a color which is very close to white.

The amount of bleaching agent added to reservoir 78 is about 0.25 weight percent of the puree and aqueous solution being bleached. The bleaching agent will typically be dispersed in a carrier, such as cornstock, with the active bleaching agent being about 30–35 weight percent of the bleaching agent solution. The percentage of active bleaching agent added, therefore, will be about 0.07 to about 0.09 weight percent of the mixture of aqueous solution and carrot material.

If the bleaching step is then followed by an enzyme treatment step 42, about 0.02 weight percent of an enzyme, such as pectinase, is added. Enzyme treatment preferably occurs at a temperature of about 120° F. using pectinase enzyme. Since it is desirable to have a continuous processing operation with bleaching at a higher temperature than enzyme treatment, the bleaching can take place in a bleaching reservoir 78 at one temperature and the enzyme treatment in holding tank 80 (FIG. 2).

One effect of bleaching for only 2 hours is that the water absorption capacity of the resulting fiber product will be in the range of about 8 to 10 times the weight of the fiber product. This is still a substantial increase over the dietary fiber products, as shown in Table II. When 4 hours of bleaching is undertaken, the water absorption capacity will increase to about 12 times the resulting fiber weight, and if 4 hours of bleaching is followed by at least 30 minutes of enzyme treatment, the fiber product will have a water absorption capacity of 14 to 15 times the weight of the resultant fiber powder.

After the bleaching and/or enzyme treatment steps 41 and 42, the present process includes step 43 of drying the bleached carrot material to produce a dried carrot fiber product having high water absorption capacity. Drying most preferably includes an intermediate moisture reduction step 44, which may be accomplished by pumping the mixture of bleached carrot material puree and aqueous solution to a water separation device, such as a screw press. At step 46 the water separation device separates the aqueous solution. including the spent bleach and enzymes, from the bleached carrot material puree. This separation process preferably is performed until the solid contents of the puree is about 20% by weight, or higher. Typically, the aqueous solution being pressed off by step 46 will have a Brix number of 1 or less (most usually a Brix of about 0.4), indicating that very little (below 1% by weight of the solids) of sugar remains in the bleached carrot puree after pressing operation 46.

It is possible to dry the pressed carrot material puree in any number of ways, for example, oven drying, air drying or spray drying. In the most preferred form of the present process, however, the puree at 20% solids by weight after pressing is fed, at step 48, to a flash drying apparatus 86 (FIG. 2) for drying step 43. The powered fiber material which results from flash drying at step 43 may be used in some applications without further processing. Most preferably, however, the flash dried carrot fiber powder is milled while drying continues at step 49 to reduce the particle size, and then it is sized at step 51 before an end product of carrot fiber powder 52 is achieved.

Milling step 49 is accomplished so that a substantial majority of the particles in the dried powder will pass through a sizing device, for example, a sifter which will pass particles having a size of 200 microns or less. In the most preferred form, the sizing device passes particles having a size of 100 microns or less. Coarse particles from the milling step are returned to the mill at step 54.

The most preferred form of flash drying apparatus for use in producing high water absorption capacity dietary fiber product is a stream of hot air into which the bleached and pressed carrot material is injected, preferably by dropping through an airlock. Moreover, the stream of hot air is preferably confined by a conduit with temperature of the hot air traveling in the conduit being preferably above 500° F., and most preferably in the range of about 550° F. to about 600° F. The airlock is at an upstream end of the conduit. The moist carrot material introduced through the airlock into the stream of hot air will cause the air temperature to drop from about 550° F. to about 200° F. in 20 feet, or less at which point the flash dried fiber product is discharged from the downstream end of the flash drying conduit. Optionally, the bleached and pressed carrot material also can be passed through a Rietz deintegrator 85 (FIG. 2) in advance of the drying step, which will increase the overall fluffiness and texture of the resulting powered fiber product.

Milling step 49 can also be accomplished using a number of different types of conventional milling machines. In the most preferred form of the present process, however, step 49 is accomplished using a turbine mill operating at a tip speed of over 20,000 feet per minute, and most preferably in the range of about 23,000 to 26,000 feet per minute. This high tip speed is very effective in reducing particle size efficiently As the speed of the turbine mill is reduced, the energy required to effect particle size reduction is greatly increased.

Moreover, it has been found to be highly advantageous to continue drying during the milling step. This can be accomplished by coupling the downstream end of the flash drying conduit to the turbine mill so that substantially all of the hot air passes through the turbine mill with the flash dried powder.

The reduction of the particle size of the refined carrot fiber product has some effect on the water absorption capacity, but is primarily advantageous in terms of producing a fiber product which has good texture characteristics when incorporated into food stuffs, and particularly baked food products.

The dietary carrot fiber product resulting from the process of the present invention may be used in food applications at a rate of between about 0.5 to about 15% by weight. This rate effectively fortifies the food to maximize health benefits in the diet. However, the amount of carrot fiber used in any given formulation is determined largely by the quantity that can be tolerated from a functional standpoint. That is, the amount of added fiber is generally as high as is acceptable from an organoleptic evaluation of the food. Due to its unique character and water binding capacity, the present dietary carrot fiber can be used in foods at lower rates than other fibers to obtain the same functional results.

In most baked goods, refined and bleached carrot fiber is used at rates between 0.5% to 7% by weight. Baked goods include breads, crackers, muffins, cakes, cookies, rolls, pastries, and other baked products made primarily from flour, starch and other grain-based ingredients.

In coated or breaded foods, fiber is often 5% to 15% of the formulation. The fiber may be blended with the other coating components and used as a blend, or the fiber may be incorporated into the bread or cracker dough prior to cooking, or ground and used as a bread crumb or other particulate matter within the coating or breading mix. The present carrot-based dietary fiber can also be used in food products such as sausages (to retain moisture) and to coat cheeses to make them be free-flowing. Cosmetic uses of the present carrot fiber product also may be made.

Referring now to FIG. 2, a schematic diagram of apparatus suitable for use in practicing the process and producing the dietary fiber product of the present invention is shown. When cut-and-peel puree is used, source 62*a* such as a cut-and-peel line, can be coupled by conveying and mixing conduit 61*a* to the remainder of the fiber extraction apparatus. As puree from the cut-and-peel operation is pumped, aqueous solution from source 63 is introduced into the conduit to wash and bleach the puree as it is conveyed to water separator 67. The residence time in the apparatus 61*a* is only a few minutes, which is all that is required to lower the sugar level to below 1% of the solid.

When a grade-out source 62*b* is used, the grade-outs are ground in grinder 65 to produce a carrot material puree and the puree is introduced into mixing tank 61*b* in roughly equal amounts by weight with aqueous solution from a source 63. Tank 61*b* includes mixer 64 which can advantageously take the form of a ribbon mixer, as is widely used in the industry for mixing food products. A typical manufacturer of ribbon mixers is Hayes & Stolz Industrial Mfg. Co., Inc. of Fort Worth, Tex.

After mixing for 5 to 60 minutes, depending on how vigorous the mixer is, the mixture can be sent to separator 67. The carrot material puree, having a large surface area, is exposed to the aqueous solution for dissolving of sugars out of the carrot material puree in tank 61*b*. The puree then is pumped from tank 61*b*, as indicated by arrow 66, to a separation device or assembly 67, which separates the aqueous solution (carrying the dissolved sugars) from the carrot material puree, as indicated by arrow 68. If the first mixing step did not remove sufficient amount of the sugar, the puree is pumped or returned from the separation apparatus 67 to the mixing tank 61*b*, as indicated by arrow 69. If substantially all the sugar has been removed from the puree, the puree is pumped to a grinding assembly, as indicated by arrow 71. The various pumping, valving and control apparatus, as well as sugar level sensing apparatus, are well known in the art and will not be shown or described further herein.

Separation assembly 67 can take numerous forms, but advantageously it can be provided by hydrosieves, strainers or hydroshears, after which the puree may be fed to a belt press for further water reduction. Hydrosieves and hydroshears are commercially available through Waterlink Separations, Inc. of Lake Bluff, Ill., while belt presses of the type employed in food processing plants are also known and are commercially available through Frontier Technology of Allegan, Mich.

The substantially sugarless carrot material puree may then be pumped from the separation assembly 67 to a grinding tank 72, at which point further aqueous solution can be pumped from source 63 into the grinding tank to wash the puree and add sufficient moisture so that wet grinding of the puree in wet grinder 73 can be accomplished. Wet grinders are also known in the industry and are commercially available under the trademark BROWN, Model 202, through Brown International of Covina, Calif. Typically, the particles which are too big to pass through the grinder will be scalped off of the wet grinder operation by a scalping screen. As described above, the scalped material may be disposed of or recycled back to a grinding operation, particularly if carrot material puree is formed from grade-outs or raw carrots which are ground prior to introduction into mixing tank 61b.

From wet grinder 73, will preferably pass particles having a size of 3 millimeters or less. The puree and aqueous solution are essentially pushed through the scalping screen and because much of the material is pulp, it will pass easily through the screen.

From the wet grinder, the material passing through the scalping screen moves to a bleaching reservoir 78. Reservoir 78 can be provided with a mixer 79, such as a ribbon mixer, and preferably includes a heater jacket 81, which is used to apply heat to the contents of reservoir 78. A source 82 of bleaching agent is coupled for pumping bleaching agent into reservoir 78, while the puree and aqueous solution are mixed by mixer 79. K-TRON Model K2LDST20 loss-in-weight feeders manufactured by K-TRON North America of Pittman, N.J. can be used to dispense the bleaching agent.

Puree which has been bleached can then be passed to a holding tank 80 for further bleaching, and if desired, for enzyme treatment. Thus, bleaching in reservoir 78 for about 1 hour at 145° F. can take place, while holding for further bleaching at 120° F. in tank 80 for 3 hours can follow.

When enzyme treatment is used, source of enzymes 83 feeds enzymes into holding tank 80, which is operating on an elevated temperature, but a temperature below tank or reservoir 78. Thus, a heater (not shown) holds the holding tank 80 at a temperature such as 120° F.

Bleached carrot material is then pumped to a screw press 84, which reduces the moisture of the puree by pressing out most of the aqueous solution and any residual sugars from the puree, as indicated by arrow 95. The screw press preferably is operated to raise the solids content of the puree to above about 20%. Prior to screw press 84, the puree may be optionally filtered in a belt press (not shown) to reduce moisture. It is also possible to inject water (not shown) to further wash the puree after bleaching during the initial stages of the belt press and screw press water separation device 84. Screw presses suitable for use in the present process are manufactured by Hosokawa Bepex Corporation, Santa Rosa, Calif.

Dryer assembly, generally designated 86, then receives the pressed puree material for further water reduction. Dryer assembly 86 will reduce the water content in the fiber from about 80% to preferably less than about 8%, and this can be accomplished by an oven, air dryer, spray dryer or, in the preferred embodiment, a flash dryer.

The flash dryer advantageously may be constructed as a flash drying conduit 87 which is coupled to a source of hot air and a blower 88 at an upstream end 89 of the conduit. An air lock assembly 91 receives pressed, bleached, carrot material puree from water separation device 84 and injects, drops or meters the same into conduit 87. The source of hot air is blown along the conduit from upstream end 89 toward downstream end 92, and the air in the flash drying conduit will be very hot, for example 500° F. to 600° F. As the pressed, bleached carrot material puree is dropped into conduit 87, it is blown to discharge end 92, and by the time it reaches the discharge end 92, the air temperature in which the puree is entrained during the flash drying step has dropped to about 200° F. The resonance time in conduit 87 of the puree is as little as 3 seconds.

In the preferred form, the downstream end 92 of the flash drying conduit is directly coupled to discharge dried carrot fiber powder directly into turbine mill 93 so drying will be occurring simultaneously with milling. It has been found that water absorbtion capacity is reduced if the product is dried, and then after drying, milled. Simultaneous milling and drying is preferred. A turbine mill suitable for use in the present invention is sold under the trademark PULVACRON, Model PCS-76, manufactured by Hosokawa Bepex Corporation, Santa Rosa, Calif., and it typically has a grinding tip speed which is variable. In the preferred form of the present invention turbine mill 93 is operated at a tip speed in excess of 20,000 feet per minute with maximum efficiency of particle reduction occurring at about 26,000 feet per minute.

The dried and ground fiber product powder then preferably is sent to a sizing device or sifter 94 which can be a 100-mesh screen, or more preferably a 200-mesh screen. Sizing sifters are commercially available under the trademark TRU-BALANCE from Great Western Manufacturing, Inc. of Leavenworth, Kans. Ninety-five percent of the particles must pass the sizing sifter to produce the final product, as indicated by arrow 96. Coarse fiber material can be returned to the turbine mill, as indicated by arrow 97. The preferred particle size for baking applications is generally below 100 microns, which will be achieved if a 200-mesh screen is employed as a sizing sifter 94. The Model 221 TRU-BALANCE sifter with a 200-mesh screen passes particles up to 86 microns.

In the examples that follow the characteristics of the carrot fiber produced were measured according to the following standards:

Total Dietary Fiber

The percentage of total dietary fiber present in carrot fiber samples was measured by the AOAC Method 991.43.

Soluble Dietary Fiber

The percentage of soluble dietary fiber present in carrot fiber samples was measured by the difference between the total dietary fiber method (AOAC method #991.43) and the insoluble fiber (AOAC Method 991.43).

Water Binding Capacity

The water binding capacity of fibers was measured by using American Association of Cereal Chemists (AACC) Method 56-20.

EXAMPLE 1

A food grade dietary fiber was made using the process of the present invention with carrot material from a cut-and-peel carrot processing operation. About equal weight percentages of carrot puree and aqueous solution were mixed in mixing conduit 61a for about 3 minutes. The aqueous solution was separated from the puree using a belt press and then washed with an equal amount of aqueous solution and ground to pass a 3 millimeter sieve. The sized puree was bleached for 4 hours in benzoyl peroxide at 145° F. and then pressed in a screw press to reduce the moisture content until the solids content was 20% by weight. Next, the bleached puree was dried in a flash dryer at 600° F. and milled while being dried by a turbine mill operating at 26,000 feet per minute. Dried carrot fiber powder passing a 100-mesh screen was then used to form a food product.

The dietary carrot fiber produced n this example had the following specifications:

| APPEARANCE | |
|---|---|
| Color | Creamy White |
| Flavor and Odor | Bland and Neutral |
| Granulation | Minimum 98% through a U.S.A, #100 testing sieve |
| Water Binding | 12 times by weight |
| NUTRIENTS | Per 100 g |
| Calories | 124 |
| Total Fat | 0.39 g |
| Saturated Fat | 0.13 g |
| Calories from Fat | 3.5 |
| Cholesterol | none |
| Total Carbohydrates | 86.4 g |
| Sugars (Sucrose, Fructose, Glucose) | 0.4 g |
| Protein, 6.25 Factor | 2.45 g |
| Sodium | 0.18 g |
| Vitamin A | none |
| Vitamin C | none |
| Calcium | 1.36 g |
| Iron | 6.45 mg |
| total Dietary Fiber | 86.0 g |
| Moisture | 6.4 g |

-continued

| | |
|---|---|
| Ash | 4.4 g |
| Potassium | 0.335 g |

The carrot-based dietary fiber product was then used to produce a bread, and the bread compared to bread made from other fibers. Bread was prepared according to the following formulation and procedure.

Four fibers (carrot, soy, cotton seed, and wheat) were compared in a bake test (fiber was added at 15%). There was an absorption series run on each of the fiber breads to determine the bake water absorption. Fifteen baker's percent fiber addition was chosen because a "good source of fiber" claim can be used by the products producer when fiber is raised to this level.

The pH was taken in a 1% solution.

The water absorption was determined by AACC method 56-20.

The bake formula used was the following:

High Fiber Pan Bread

Sponge and Dough (Bakers %)

Sponge:

Water (55%), yeast (1%), yeast food (0.5%), vital wheat gluten (6%), and flour (70%) were mixed for 2 minutes.

The sponge was fermented 2 ½ hours.

Dough:

Flour, high gluten (30%), fiber (15%), sugar (7%), salt (2%), gum (0.2%), calcium propionate (0.1%), shortening (3%), and water (variable) were mixed with the sponge to optimum development.

Allow fully mixed dough to rest for 20 minutes in fermentation cabinet.

Divide dough into 524 g pieces.

Rest for 10 minutes at room temperature.

Mold.

Proof to height.

Bake 24 minutes at 420° F.

| Results: | pH | Water Binding Capacity |
|---|---|---|
| Wheat | 9.0 | 4x |
| Cottonseed | 5.9 | 4x |
| Soy | 7.1 | 2x |
| Carrot | 4.8 | 12x |

| Bake Results: | | | | | |
|---|---|---|---|---|---|
| | Absorption | Vol. | Grain | Texture | Crumb Color | Taste |
| Wheat | 100% | 2475 cc | tight silky | good | creamy | good |
| Cottonseed | 100% | 2475 cc | tight silky | good | creamy | good |
| Soy | 95% | 2725 cc | tight silky | good | creamy yellow | good |
| Carrot | 130% | 1800 cc | open slightly | harsh | deep yellow | good |

Conclusions:

Wheat, Cottonseed and Soy fibers can be replaced for one another in a bread formula with little adjustment. Carrot has higher water absorption. This makes it difficult to substitute for other fibers at a high level in bread. The carrot fiber bread has a lower volume and the grain is open and the texture is slightly harsh compared to the other fibers.

All fiber samples produced acceptable bread.

EXAMPLE 2

With a different bread formula and at a lower fiber level (6%) the results were similar, except for the crumb grain and texture were very good for all the breads. The volume, and color were comparable for the fibers tested. Carrot fiber produced bread with higher water absorption and therefore a higher yield.

EXAMPLE 3

Carrot fiber from the present process has also been used as a fat substitute in a tortilla formula.

The formula in baker's percent includes: flour, bread (100%), water (58%), salt (1.5%), baking powder (1.5%), calcium propionate (0.2%), and shortening (11%). When carrot fiber replaces the shortening a comparable quality tortilla is produced and the water is increased to 100%. The yield per batch increases 25%.

EXAMPLE 4

TABLE IV

Farinograph Results:

| | Peak (min.) | Tolerance (min.) | Absorption % | Fiber Abs. % | MTI BU |
|---|---|---|---|---|---|
| Control | 6.5 | 14.00 | 60.5 | | 20 |
| 0.5% carrot fiber substitution | 6.5 | 13.25 | 62.5 | 460.5 | 25 |
| 1.0% carrot fiber substitution | 6.5 | 12.50 | 64.5 | 460.5 | 30 |
| 1.5% carrot fiber substitution | 7.0 | 11.75 | 66.4 | 453.8 | 30 |
| 2.0% carrot fiber substitution | 6.5 | 11.50 | 67.8 | 425.5 | 25 |
| 2.5% carrot fiber substitution | 6.5 | 11.75 | 69.9 | 436.5 | 25 |
| 3.0% carrot fiber substitution | 7.0 | 15.00 | 72.2 | 450.5 | 15 |
| 3.5% carrot fiber substitution | 7.0 | 15.00 | 73.8 | 440.5 | 20 |
| 4.0% carrot fiber substitution | 7.5 | 14.00 | 75.6 | 438.0 | 15 |
| 4.5% carrot fiber substitution | 8.0 | 13.50 | 77.7 | 442.7 | 20 |
| 5.0% carrot fiber | 7.5 | 12.00 | 79.5 | 440.5 | 20 |

This Farinograph data shows that even at 5% substitution in a formula the tolerance goes down a little and the mixing time goes up. The fiber absorption is consistently about 445% when started with 100% fiber—that is it absorbs 4.5 times its own weight when mixed in a dough. The MTI is the Mixing Tolerance Index and the higher the number the less tolerant the dough is to over-mixing. This number changes little from the control, even at 5% fiber substitution.

EXAMPLE 5

Color was measured with the Hunter Lab Model D25 (Hunter Associates Laboratory, Inc., Reston, Va.)

Hunter Colorimater Values

| Fiber | L | a | b |
|---|---|---|---|
| Carrot | 84.9 | 0.2 | 12.3 |
| Cellulose | 93.5 | 0.8 | 5.2 |
| Wheat | 90.0 | 0.1 | 6.4 |
| Pea | 81.4 | 0.2 | 12.1 |
| Cottonseed | 88.4 | 0.6 | 7.6 |
| Oat | 87.3 | 1.2 | 14.8 |
| Soy | 91.1 | −0.4 | 7.9 |

The L value measures the lightness and darkness of the sample with 100 being very white and 0 being black. The carrot fiber is one of the least bright samples tested. It is in the range of oat and cottonseed fiber. The Hunter a-value measures green to red with −100 being totally green, and +100 being totally red.

These samples are so close to 0 that they are not either in the green or red areas. The Hunter b-value measures the blue to yellow with −100 being totally blue and +100 being totally yellow. Carrot is very similar to pea fiber and close in range to oat fiber. The other fibers are less yellow.

What is claimed is:

1. A process for producing a fiber product having a high water absorption capacity comprising the steps of:
   a. selecting carrot material as the source for the fiber product;
   b. leaching sugar from a puree of carrot material using an aqueous solution until the sugar remaining in the carrot material has been substantially reduced;
   c. after the leaching step, separating the carrot material having a particle size below a predetermined level from the aqueous solution;
   d. bleaching the separated carrot material while in an aqueous solution with a bleaching agent;
   e. after the bleaching step, removing the bleached carrot material from the aqueous solution; and
   f. drying the bleached carrot material to produce a dried carrot fiber product having high water absorption capacity.

2. The process as defined in claim 1 wherein,
the bleaching step is accomplished by using a bleaching agent selected from the group consisting of benzoyl peroxide, hydrogen peroxide and peracitic acid.

3. The process as defined in claim 2 wherein,
the bleaching step is accomplished by using benzoyl peroxide as the bleaching agent.

4. The process as defined in claim 3, and the step of:
after the bleaching step treating the carrot material with pectinase.

5. The process as defined in claim 1, and the step of:
after the bleaching step treating the carrot material with an enzyme.

6. The process as defined in claim 4 wherein,
the enzyme is a pectolitic enzyme.

7. The process as defined in claim 1 wherein,
the selecting step is accomplished by selecting carrot material which is a puree of carrot material produced as by-product of a fresh carrot cutting and peeling process.

8. The process as defined in claim 1 wherein,
the selecting step is accomplished by selecting carrot material which is a grade-out carrot material from a fresh carrot processing operation.

9. The process as defined in claim 8, and the step of:
prior to the leaching step, grinding the selected carrot material to a particle size below a predetermined level to produce a carrot material puree.

10. The process as defined in claim 1 wherein,
the selecting step is accomplished by selecting raw unprocessed carrots.

11. The process as defined in claim 10, and the step of:
prior to the leaching step, grinding the selected carrot material to a particle size below a predetermined level to produce a carrot material puree.

12. The process as defined in claim 1 wherein,
said leaching step is accomplished by the steps of adding a puree of the carrot material to the aqueous solution, mixing the carrot material with the aqueous material to contact water-soluble sugars in the carrot material with the aqueous solution and removing the carrot material from the aqueous solution.

13. The process as defined in claim 12 wherein,
the adding, mixing and removing steps are repeated until the sugar remaining in the carrot material is reduced to below about 1% by weight of the solids.

14. The process as defined in claim 1, and the step of:
after the leaching step and before the separating step, adding an aqueous solution to the carrot material; and
performing the separating step by wet-grinding the carrot material to enable a substantial majority of the carrot material to pass beyond a particle sizing device.

15. The process as defined in claim 1 wherein,
said separating step is accomplished by passing a mixture of the carrot material and an aqueous solution through a separating screen preventing passage of particulate material larger than about 3 millimeters.

16. The process as defined in claim 1 wherein,
the bleaching step is accomplished at an elevated temperature.

17. The process as defined in claim 16 wherein,
the bleaching step is accomplished at a temperature in the range of about 120 degrees F. to about 150 degrees F. while constantly mixing the carrot material and the aqueous solution.

18. The process as defined in claim 17 wherein,
the bleaching step is accomplished at a temperature in the range of about 140 degrees F. to about 145 degrees F. and the bleaching agent is benzoyl peroxide.

19. The process as defined in claim 1 wherein,
the removing step is accomplished by removing the aqueous solution from the bleached carrot material until the solids content of the remaining carrot material is above a predetermined level.

20. The process as defined in claim 19 wherein,
the removing step is accomplished by pressing the aqueous solution from the carrot material until the solids content of the remaining carrot material is at least above about 20%.

21. The process as defined in claim 1 wherein,
the drying step is accomplished by feeding the bleached carrot material into a moving hot air stream having an air temperature in excess of 500 degrees F.

22. The process as defined in claim 21 wherein,
the bleached carrot material is fed into a moving hot air stream having a temperature in the range of about 550 degrees F. to about 600 degrees F.

23. The process as defined in claim 1, and the step of:
after the drying step, milling the dried carrot material to enable a substantial majority of the carrot material to pass through a particle size limiting device passing particles below a predetermined size.

24. The process as defined in claim 23 wherein,
the milling step is accomplished using a turbine mill while simultaneously continuing the drying step in the turbine mill.

25. The process as defined in claim 24 wherein,
the turbine mill is operated at a tip speed in excess of 20,000 feed per minute.

26. The process as defined in claim 24 and the steps of:
after the separating step, adding fresh aqueous solution to the separated puree of carrot material having reduced sugar content, and
repeating the mixing, separating and adding steps until the sugar content of the puree of carrot material is reduced to less than about 1 weight percent of the solids.

27. The process as defined in claim 23 wherein,
the milling step is accomplished until 95% of the carrot material can pass through a sizing device passing particles having size of 200 microns or less.

28. The process as defined in claim 23 wherein,
the milling step is accomplished until 95% of the carrot material can pass through a sizing device passing particles having a size of 100 microns or less.

29. The product produced by the process as defined in claim 1.

30. A nutritionally-fortified, fiber containing, food product comprising:
a food product having between about 0.5 weight percent and about 15 weight percent of a carrot fiber produced by the process as defined in claim 1.

31. A process for producing a food grade, dietary fiber product having a water binding capacity of at least about 10 times by weight comprising the steps of:
a. selecting carrot material as a source for the fiber product;
b. mixing a puree of carrot material having a solids content in the range of about 8 to about 15 weight percent with an aqueous solution sufficient to reduce the solids content of the mixture to a range of about 1 to 6 weight percent in order to contact the carrot material with the aqueous solution for the removal of sugar from the carrot material;
c. separating the carrot material from the aqueous solution to produce a puree of carrot material with reduced sugar content having a solids content of at least about 8%;
d. adding fresh aqueous solution to the puree of carrot material with reduced sugar content until the solids content of the resulting mixture is about 4 to about 6 weight percent;
e. after the adding step, wet grinding the carrot material in the aqueous solution until a substantial majority of the carrot material therein has a size of about 3 millimeters or less;
f. elevating the temperature of the mixture of carrot material and aqueous solution passing through the sizing device to a temperature above about 100 degrees F. and below about 150 degrees F.;
g. mixing a bleaching agent, selected from the group consisting of benzoyl peroxide, hydrogen peroxide and peracitic acid, with the mixture of carrot material and aqueous solution at the elevated temperature until the carrot material is bleached to a creamy color;
h. removing the aqueous solution from the bleached carrot material until the solids content of the bleached carrot material is at least about 20%;
i. drying the bleached carrot material after removing the aqueous solution;
j. milling the dried carrot material until a 95% of the milled carrot material has a size of less than 200 microns; and
k. passing the milled, dried, carrot material through a sizing device to produce a food grade dietary fiber product of known maximum particle size and a water bending capacity of at least 10 times by weight.

32. The process as defined in claim 31 wherein,
the carrot material puree is obtained from a fresh carrot cutting and peeling process.

33. The process as defined in claim 32 wherein,
the mixing step is accomplished by mixing a puree of carrot material having a solids content of about 10 to about 12 weight percent with an aqueous solution sufficient to reduce the solids content of the mixture to about 1 to about 6 weight percent.

34. The process as defined in claim 33 wherein, the separating step produces a puree of carrot material having a solids content of about 10 to about 12 weight percent.

35. The process as defined in claim 34 wherein, the adding step is accomplished by adding fresh aqueous solution until the solids content is about 5 to about 6 weight percent.

36. The process as defined in claim 35 wherein, the elevating step is accomplished by elevating the temperature of the mixture of carrot material and aqueous solution to about 140 to about 150 degrees F., and the step of mixing a bleaching agent is accomplished by mixing benzoyl peroxide with the mixture while at the elevated temperature in the amount of at least 0.07% by weight of the mixture of carrot material and aqueous solution.

37. The process as defined in claim 34 wherein, the step of mixing a bleaching agent is continued for at least 2 hours.

38. The process as defined in claim 34 wherein, the step of mixing a bleaching agent is continued for at least 4 hours.

39. The process as defined in claim 38 and the step of:

after the step of mixing a bleaching agent, mixing a pectinase enzyme with the bleached carrot material and aqueous solution while at a temperature between about 100 degrees F. and about 130 degrees F.

40. The process as defined in claim 36, and the step of:

after the step of mixing a bleaching agent, mixing a pectinase enzyme with the bleached carrot material and aqueous solution while at a temperature between about 100 degrees F. and about 130 degrees F.

41. The process as defined in claim 40 wherein, the step of mixing a pectinase enzyme is continued for at least about 25 minutes at a temperature of about 115 degrees F. to about 125 degrees F. with about 0.02 weight percent of pectinase enzyme being mixed with the carrot material and aqueous solution.

42. The process as defined in claim 36 wherein, the removing step is accomplished by removing aqueous solution until the solids content is at least about 20 weight percent.

43. The process as defined in claim 42 wherein, the drying step is accomplished by flash drying the bleached carrot material.

44. The process as defined in claim 42 wherein, the drying step is accomplished by inserting the bleached carrot material into a stream of air heated to a temperature in excess of 500 degrees F.

45. The process as defined in claim 42 wherein, the drying step is accomplished by dropping the bleached carrot material into a conduit having heated air flowing therein at a temperature in excess of 550 degrees F.

46. The process as defined in claim 45 wherein, the milling step is accomplished by milling the dried carrot material to a size less than 200 microns using a turbine mill operating at a tip speed of over 20,000 feet per minute while continuing to dry the carrot material in the turbine mill.

47. The product produced by the process as defined in claim 46.

48. The process as defined in claim 45, and the step of:

prior to said drying step, passing bleached carrot material through a disintegrator.

49. The process as defined in claim 31 wherein, the carrot material is obtained from carrots which have been graded out from a fresh carrot processing operation, and the step of:

grinding the graded out fresh carrots to form the puree of carrot material.

50. The product produced by the process as defined in claim 31.

51. A nutritionally-fortified, fiber containing, food product comprising:

a food product having between about 0.5 weight percent and about 15 weight percent of a carrot fiber produced by the process as defined in claim 31.

52. A dietary fiber product comprising:

a substantially sugar-free, bleached, carrot fiber having a particle size passing through a screen of 200 microns and a water binding capacity in excess of 10 times its weight.

53. The dietary fiber product as defined in claim 52 wherein, the carrot fiber has a particle size passing through a screen of 100 microns and a water binding capacity in the range of about 12 to about 15 times its weight.

54. An apparatus for producing a fiber product having high water absorption capacity comprising:

a. a mixing apparatus formed to mix a puree of carrot material and aqueous solution therein;

a water removal assembly proximate the mixing apparatus and formed to receive a mixture of carrot material and aqueous solution from the mixing apparatus and to separate the aqueous solution from the carrot material;

c. a source of aqueous solution connected for input to the mixing apparatus;

d. a grinder receiving carrot material from the water removal assembly and formed to grind the carrot material while in an aqueous solution;

e. a sizing device receiving ground carrot material from the grinder and formed to allow passage of particulate carrot material below a predetermined size with aqueous solution to a mixing reservoir;

f. a mixing reservoir having a mixing assembly therein and positioned to receive sized carrot material and aqueous solution from the sizing device;

g. a source of bleaching agent coupled for input of bleaching agent into the mixing reservoir;

h. a water separation device fluid coupled to receive bleached carrot material and aqueous solution and formed to remove aqueous solution from the carrot material to substantially reduce the moisture content of the carrot material;

i. a dryer receiving separated carrot material from the water separation device and formed to dry the carrot material into a powder;

j. a mill receiving powder from the dryer and formed to reduce the size of the particles in the powder; and k. a sizing apparatus receiving milled powder from the mill and formed to allow passage of powder below a predetermined size.

55. An apparatus for producing a fiber product having high water absorption capacity comprising:

a. a mixing apparatus formed to mix a puree of carrot material and aqueous solution therein;

b. a water removal assembly proximate the mixing apparatus and formed to receive a mixture of carrot material and aqueous solution from the mixing apparatus and to separate the aqueous solution from the carrot material;

c. a source of aqueous solution connected for input to the mixing apparatus;

d. a grinder receiving carrot material from the water removal assembly and formed to grind the carrot material while in an aqueous solution, the grinder is formed to grind substantial majority of the carrot material to a particle size below about 3 millimeters;

e. a sizing device receiving ground carrot material from the grinder and formed to allow passage of particulate carrot material of 3 millimeters or less with aqueous solution to a mixing reservoir;

f. a mixing reservoir having a mixing assembly therein and positioned to receive sized carrot material and aqueous solution from the sizing device;

g. a source of bleaching agent coupled for input of bleaching agent into the mixing reservoir;

h. a water separation device fluid coupled to receive bleached carrot material and aqueous solution and formed to remove aqueous solution from the carrot material to substantially reduce the moisture content of the carrot material; and i. a dryer receiving separated carrot material from the water separation device and formed to dry the carrot material into a powder.

56. An apparatus for producing a fiber product having high water absorption capacity comprising:

a. a mixing apparatus formed to mix a puree of carrot material and aqueous solution therein;

b. a water removal assembly proximate the mixing apparatus and formed to receive a mixture of carrot material and aqueous solution from the mixing apparatus and to separate the aqueous solution from the carrot material;

c. a source of aqueous solution connected for input to the mixing apparatus;

d. a grinder receiving carrot material from the water removal assembly and formed to grind the carrot material from the water removal assembly and formed to grind the carrot material while in an aqueous solution;

e. a sizing device receiving ground carrot material from the grinder and formed to allow passage of particulate carrot material below a predetermined size with aqueous solution to a mixing reservoir;

f. a mixing reservoir having a mixing assembly therein and positioned to receive sized carrot material and aqueous solution from the sizing device;

g. a source of benzoyl peroxide bleaching agent coupled for input of bleaching agent into the mixing reservoir;

h. a water separation device fluid coupled to receive bleached carrot material aqueous solution and formed to remove aqueous solution from the carrot material to substantially reduce the moisture content of the carrot material; and i. a dryer receiving separated carrot material from the water separation device formed to dry the carrot material into a powder.

57. An apparatus for producing a fiber product having high water absorption capacity comprising:

a. a mixing apparatus formed to mix a puree of carrot material and aqueous solution therein;

a water removal assembly proximate the mixing apparatus and formed to receive a mixture of carrot material and aqueous solution from the mixing apparatus and to separate the aqueous solution from the carrot material;

c. a source of aqueous solution connected for input to the mixing apparatus;

d. a grinder receiving carrot material from the water removal assembly and formed to grind the carrot material while in an aqueous solution;

e. a sizing device receiving ground carrot material from the grinder and formed allow passage of particulate carrot material below a predetermined size with aqueous solution to a mixing reservoir;

f. a mixing reservoir having a mixing assembly therein and positioned to receive sized carrot material and aqueous solution from the sizing device;

g. a source of peracitic bleaching agent coupled for input of bleaching agent into the mixing reservoir;

h. a water separation device fluid coupled to receive bleached carrot material and aqueous solution and formed to remove aqueous solution from the carrot material to substantially reduce the moisture content of the carrot material; and i. a dryer receiving separated carrot material from the water separation device and formed to dry the carrot material into a powder.

58. An apparatus for producing a fiber produce having high water absorption capacity comprising:

a. a mixing apparatus formed to mix a puree of carrot material and aqueous solution therein;

b. a water removal assembly proximate the mixing apparatus and formed to receive a mixture of carrot material and aqueous solution from the mixing apparatus and to separate the aqueous solution from the carrot material;

c. a source of aqueous solution connected for input to the mixing apparatus;

d. a grinder receiving carrot material from the water removal assembly and formed to grind the carrot material while in an aqueous solution;

e. a sizing device receiving ground carrot material from the grinder and formed to allow passage of particulate carrot material below a predetermined size with aqueous solution to a mixing reservoir;

f. a mixing reservoir having a mixing assembly therein and positioned to receive sized carrot material and aqueous solution from the sizing device;

g. a source of bleaching agent coupled for input of bleaching agent into the mixing reservoir;

h. a water separation device fluid coupled to receive bleached carrot material and aqueous solution and formed to remove aqueous solution from the carrot material to substantially reduce the moisture content of the carrot material; and i. a dryer receiving separated carrot material from the water separation device and formed to dry the carrot material into a powder at an operating temerature in excess of 500 degrees F.

59. The apparatus as defined in claim 58 wherein, the flash dryer is provided by a length of conduit; a source of heated air; a blower coupled to blow the heated air down the length of conduit; and an air lock positioned proximate an upstream end of the length of conduit, the air lock being formed for introduction of bleached carrot fiber into the conduit during movement of hot air through the length of conduit to a downstream end of the length of conduit.

60. The apparatus as defined in claim 59, and a turbine mill coupled to receive dried powdered carrot material directly from the end of the length of conduit and formed to mill the carrot material to a smaller size.

61. The apparatus as defined in claim 60 wherein, the turbine mill operates at a tip speed in excess of 20,000 feet per minute and mills 95% of the dried powered carrot material to a particle size below 200 microns.

62. The apparatus as defined in claim 61, and a sizing apparatus positioned to receive milled carrot material from the turbine mill.

63. The apparatus as defined in claim 62, wherein, the mill is a turbine mill formed to reduce the size of a substantial majority of the particles in the powder to a size passing a 100 micron sizing screen; and a 100 micron sizing screen positioned to receive reduced size powder from the hammer mill and pass the sized powder as an end product.

64. The apparatus as defined in claim 61 wherein, the sizing device is formed to pass milled carrot material having a particle size of 100 microns or less therethrough.

65. A nutritionally-fortified, fiber containing, food product comprising:

a food product having between about 0.5 weight percent and about 125 weight percent color, flavor and odor free and having a water absorption capacity of at least 8 times its weight and at least 70% total dietary fiber with at least 12% soluble dietary fiber.

66. The food product as defined in claim 65 wherein, the food product is one of a bread, a cereal, a baked food product, a coated food product and a sausage.

* * * * *

UNITED STATES PATENT AND TRADEMARK OFFICE
CERTIFICATE OF CORRECTION

PATENT NO. : 6,645,546 B2  
DATED : November 11, 2003  
INVENTOR(S) : Roney et al.

It is certified that error appears in the above-identified patent and that said Letters Patent is hereby corrected as shown below:

Title page,
Item [56], OTHER PUBLICATIONS, insert -- Guédon *et al.*, "Does Chronic Supplementation of the Diet with Dietary Fibre Extracted from Pea or Carrot Affect Colonic Motility in Man?" *British Journal of Nutrition*, 76 pp. 51-61 (1996). --

Column 12,
Line 23, delete "a200-mesh" and insert -- a 200-mesh --.

Column 21,
Lines 12 and 13, after "material" delete "from the water removal assembly and formed to grind the carrot material".

Signed and Sealed this

Thirteenth Day of April, 2004

JON W. DUDAS
*Acting Director of the United States Patent and Trademark Office*